(12) United States Patent
Shibata

(10) Patent No.: US 7,484,379 B2
(45) Date of Patent: Feb. 3, 2009

(54) AIR CONDITIONER

(75) Inventor: Kazuji Shibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 535 days.

(21) Appl. No.: 11/405,604

(22) Filed: Apr. 17, 2006

(65) Prior Publication Data
US 2006/0230774 A1    Oct. 19, 2006

(30) Foreign Application Priority Data
Apr. 18, 2005  (JP)  ............... 2005-119951

(51) Int. Cl.
*B60H 1/32*  (2006.01)
(52) U.S. Cl. .................... 62/222; 62/239
(58) Field of Classification Search ........... 62/222–225, 62/239, 244
See application file for complete search history.

(56) References Cited
U.S. PATENT DOCUMENTS 5,165,251 A * 11/1992 Tsukamoto et al. ........... 62/244
5,555,739 A * 9/1996 Kujirai et al. ................. 62/244
6,942,160 B2 * 9/2005 Kobayashi et al. ........ 236/92 B
7,377,554 B2 * 5/2008 Motomura et al. ....... 285/136.1

FOREIGN PATENT DOCUMENTS

| JP | 2504771 | 4/1996 |
|---|---|---|
| JP | 11-091338 | 4/1999 |
| JP | 2001-150941 | 6/2001 |
| JP | 2001-277841 | 10/2001 |
| JP | 2002-301927 | 10/2002 |

* cited by examiner

*Primary Examiner*—William E Tapolcai
(74) *Attorney, Agent, or Firm*—Harness, Dickey & Pierce, PLC

(57) ABSTRACT

An air conditioner has an air conditioner casing in which air flows, an evaporator arranged in the air conditioner casing to cool air, an evaporator-side connector which protrudes from the evaporator toward an outer side of the air conditioner casing through an opening thereof, a piping-side connector, and a heat-insulating seal member. The piping-side connector and a refrigerant decompression member are respectively arranged at two ends of a piping group. A surrounding wall member surrounding the evaporator-side connector is erected at the air conditioner casing, so that a surrounding-shaped tip portion thereof projects beyond an end surface of a protrusion side of the evaporator-side connector. The heat-insulating seal member covers a whole area between the surrounding wall member and outer peripheral surfaces of the piping group.

19 Claims, 5 Drawing Sheets

AIR CONDITIONER

CROSS REFERENCE TO RELATED APPLICATION

This application is based on a Japanese Patent Application No. 2005-119951 filed on Apr. 18, 2005, the disclosure of which is incorporated herein by reference.

FIELD OF THE INVENTION

The present invention relates to an air conditioner, and more particularly to a dew-condensation preventing construction at a connection part between an evaporator inside an air conditioner casing and a refrigerant piping outside the air conditioner casing. The air conditioner is suitably used for a vehicle, for example.

BACKGROUND OF THE INVENTION

Generally, for example, referring to JP-2001-150941A, an air conditioner for a vehicle is provided with an expansion valve, which is arranged outside an air conditioner casing and positioned between an evaporator-side connector and a piping-side connector.

A rib is provided to project from the air conditioner casing to surround a part (part except diaphragm portion) of the expansion valve which is relatively simple in shape. A heat-insulating seal member is mounted directly to a neighborhood of the rib to cover a whole surface of the expansion valve, in order to prevent generation of dew condensation water.

Moreover, it is disclosed that a periphery of the expansion valve can be also surrounded completely by a rib and covered by a heat-insulating seal member.

However, in the case where the rib surrounds only the part of the expansion valve which is relatively simple in shape, the seal member for covering the whole surface of the expansion valve becomes large. Thus, attachment of the seal member becomes troublesome. Furthermore, it is difficult to prevent dew condensation by means of a substantial heat-insulating sealing, because the part covered by the seal member has a complex shape.

In the case where the periphery of the expansion valve is surrounded completely by the rib and covered by the seal member, the rib is to be provided with a greatly strange (complicate) shape, and the space for mounting becomes large. Moreover, the seal member becomes relatively large. Furthermore, when the rib has the complicate shape, a clearance is liable to generate at the attachment of the seal member. Therefore, it is difficult to prevent dew condensation by means of a substantial heat-insulation sealing.

Moreover, in the both cases, the expansion valve is arranged at the connection part between an evaporator-side connector and a piping-side connector, so that the connection part is large-sized. Therefore, when other equipment (e.g., servomotor and linkages for driving door means in casing) is mounted around the connection part outside the air conditioner casing, the space for mounting the seal member is difficultly provided and the mounting performance is worsened.

SUMMARY OF THE INVENTION

In view of the above-described disadvantages, it is an object of the present invention to provide an air conditioner, in which a mounting performance of a heat-insulating seal member at a connection part between an evaporator-side connector and a piping-side connector is improved and dew condensation is substantially restricted.

According to the present invention, an air conditioner has an air conditioner casing in which air flows, an evaporator arranged in the air conditioner casing to cool air flowing in the air conditioner casing, an evaporator-side connector which protrudes from the evaporator toward an outer side of the air conditioner casing through an opening arranged at the air conditioner casing, a refrigerant decompression member which is arranged apart from the evaporator to decompress refrigerant, a piping group having an introduction pipe and a discharge pipe, a piping-side connector which is arranged at an opposite end of the piping group to the refrigerant decompression member, and a heat-insulating seal member. The evaporator-side connector has a refrigerant introduction passage through which refrigerant is introduced into the evaporator, and a refrigerant discharge passage through which refrigerant is discharged from the evaporator. The piping-side connector is connected with the evaporator-side connector, to respectively communicate interiors of the introduction pipe and the discharge pipe with the refrigerant introduction passage and the refrigerant discharge passage. Refrigerant decompressed by the refrigerant decompression member is introduced into the refrigerant introduction passage through the introduction pipe. Refrigerant discharged through the refrigerant discharge passage flows through the discharge pipe. The air conditioner casing has a surrounding wall member, which surrounds the evaporator-side connector and is erected at the air conditioner casing so that a surrounding-shaped tip portion thereof projects beyond an end surface of a protrusion side of the evaporator-side connector. The heat-insulating seal member is arranged to cover a whole area between the surrounding wall member and outer peripheral surfaces of the introduction pipe and the discharge pipe of the piping group.

Thus, the evaporator-side connector which is directly connected with the piping-side connector is surrounded by the surrounding wall member, which is arranged upright at the air conditioner casing. The surrounding wall member extends to the outer side of the air conditioner casing so that the tip portion thereof projects beyond the end surface of the protrusion side of the evaporator-side connector. That is, the connection part between the evaporator-side connector and the piping-side connector is encircled by the surrounding wall member.

Accordingly, the heat-insulating seal member covers the whole area between the surrounding wall member and the outer peripheral surfaces of the piping group.

Therefore, the connection part between the evaporator-side connector and the piping-side connector can be relatively small-sized. Moreover, because the heat-insulating seal member is arranged at the side of the piping group at the connection part between the evaporator-side connector and the piping-side connector, the heat-insulating seal member can be readily attached even when the space around the connection part is small.

Furthermore, the heat-insulating seal member covers the whole area between the surrounding wall member and the outer peripheral surfaces of the piping group, so that the heat insulation capacity can be substantially ensured. Thus, dew condensation can be substantially restricted, while the mounting performance of the heat-insulating seal member is improved.

Preferably, the surrounding wall member is erected at the air conditioner casing so that the tip portion projects beyond an end surface of a piping group side of the piping-side connector.

Because the surrounding wall member extends to the vicinity of the piping group, the mounting of the heat-insulating seal member become further easy while the heat-insulation seal capacity can be further improved.

More preferably, the heat-insulating seal member is arranged to contact an outer peripheral surface of the surrounding wall member and the outer peripheral surfaces of the piping group.

In this case, the heat-insulating seal member can be mounted from the outer side of the surrounding wall member and the piping group, so that the mounting thereof can be further readily performed.

Preferably, the heat-insulating seal member is arranged to contact an inner peripheral surface of the surrounding wall member and the outer peripheral surfaces of the piping group.

Thus, the heat-insulating seal member can be arranged at the inner side of the surrounding wall member, to be size-reduced. Therefore, even when the space around the surrounding wall member is small, the heat-insulating seal member having a relative small size can be mounted. Accordingly, the mounting of the heat-insulating seal member can be readily performed.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

An air conditioner according to a first embodiment of the present invention will be described with reference to FIGS. 1-2B. The air conditioner can be suitably used for a vehicle, for example.

Figure 1:
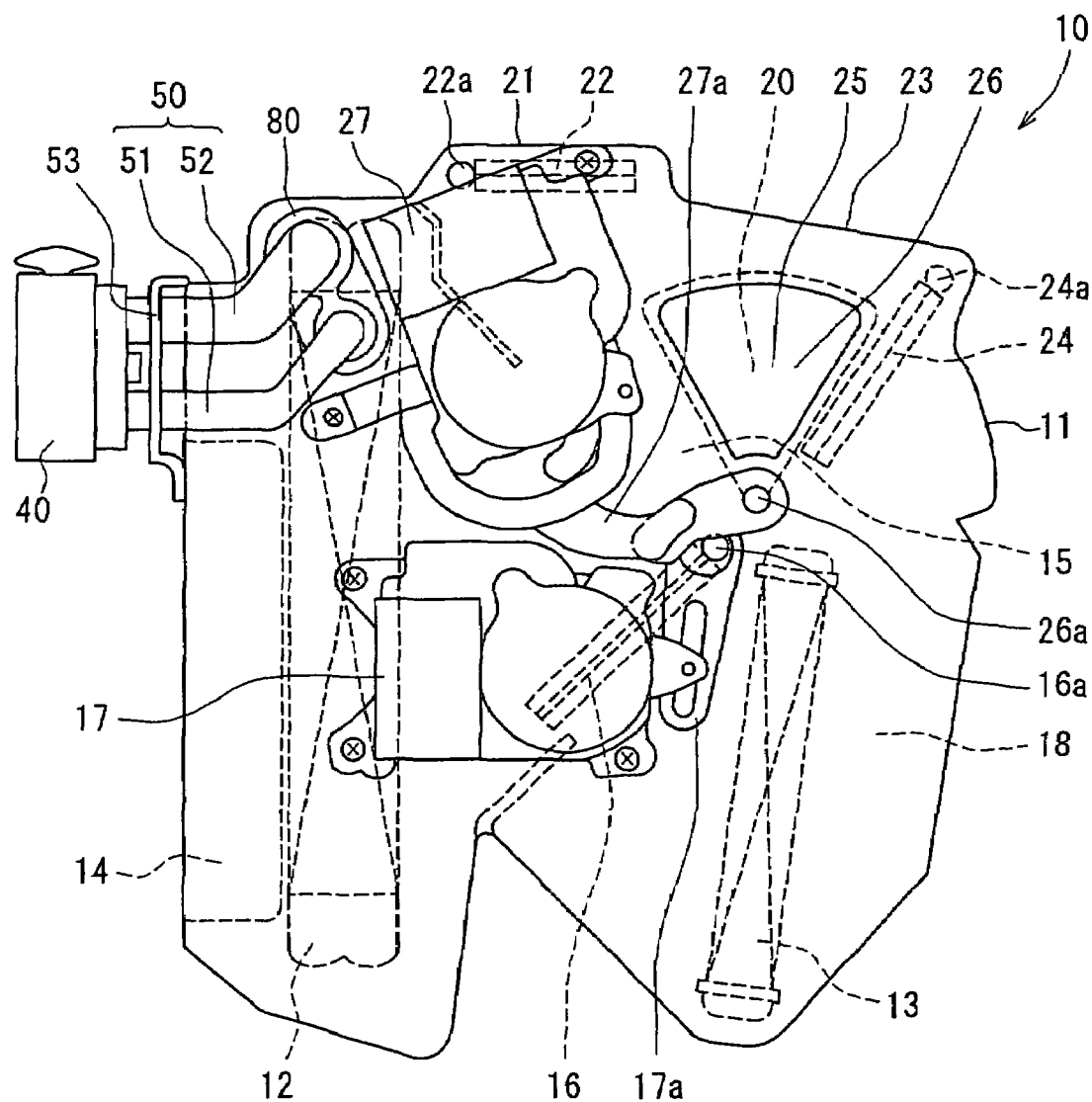
FIG. 1 is a side view showing an air conditioning component of an indoor unit of an air conditioner for a vehicle according to a first embodiment of the present invention.

A ventilation system of the air conditioner for the vehicle is mainly divided into two parts, that is, an air conditioning component 10 (of indoor unit) shown in FIG. 1 and an air blower component (not shown). The air blower component is arranged offset to an assistant seat from a central portion below a dashboard in a passenger compartment of the vehicle, while the air conditioning component 10 is arranged substantially centrally in a vehicle left-right direction below the dashboard in the passenger compartment.

The air blower component, as well known, has an inside/outside air switching box for selectively introducing inside air (air in passenger compartment) and outside air (air outside passenger compartment), and an air blower which blows air introduced through the inside/outside air switching box. The air blower includes a centrifugal multi-blade fan (e.g., sirocco fan) which is rotationally driven by an electric motor or the like.

The air conditioning component 10 has an evaporator 12 (cooling heat exchanger) and a heater core 13 (heating heat exchanger) which are arranged in a common air conditioner casing 11.

The air conditioner casing 11 is constructed of a plurality of division casings, each of which is molded by a resin (such as polypropylene resin) having a certain degree of elasticity and an excellent strength. The division casings accommodate equipments such as a door (described later), the heat exchangers 12, 13 and the like, and then are joined integrally by fastening units such as metal spring clips, screws and the like to construct the air conditioner casing 11.

The air conditioning component 10 is positioned at a substantial central portion below the dashboard in the passenger compartment, and arranged as shown in FIG. 1 with respect to a front-rear direction and an up-down direction of the vehicle.

Referring to FIG. 1, the air conditioner casing 11 is provided with an air flow inlet 14 which is positioned at a most forward portion (with respect to vehicle front-rear direction) of the air conditioner casing 11. Air blown from the air blower component flows into the air flow inlet 14. The air flow inlet 14 arranged at the air conditioner casing 11 is opened at a side surface thereof of the side of the assistant seat, to be connected to an air outlet of the air blower component which is arranged at a vehicle front side of the assistant seat.

The evaporator 12 is arranged at an immediate rear side of the air flow inlet 14 in the air conditioner casing 11, and extends transversely to the whole of an air passage defined in the air conditioner casing 11. As well known, the evaporator 12 cools air by absorbing vaporization latent heat of refrigerant of a refrigerating cycle from air.

As shown in FIG. 1, the evaporator 12, being arranged in air conditioner casing 11, is thin in the vehicle front-rear direction (i.e., vehicle longitudinal direction) and has a longitudinal direction oriented toward the vehicle up-down direction.

The evaporator 12 is connected with a piping group 50 extending from a decompression valve 40 (expansion valve), which is arranged distant from the evaporator 12 in the refrigerating cycle to function as a refrigerant decompression member. The piping group 50 includes an introduction pipe 51, through which refrigerant decompressed by the decompression valve 40 is introduced into the evaporator 12, and a discharge pipe 52, through which refrigerant evaporated in the evaporator 12 is discharged to a temperature sensing portion of the decompression valve 40.

The introduction pipe 51 and the discharge pipe 52, which construct the piping group 50, are supported in the vicinity of the decompression valve 40 by a support plate member 53 made of a resin (e.g., polypropylene resin) or the like.

The decompression valve 40 is arranged at an engine cabin side of a partition plate (fire wall which is not shown), which is disposed between the passenger compartment and an engine cabin (not shown) of the vehicle. The support plate member 53 also functions as a seal member for closing ports (arranged at partition plate), through which the piping group 50 is inserted.

The evaporator 12, being of a known stack type, is provided with multiple flat tubes which are stacked with corrugated fins intervening. That is, the corrugated fin is arranged between the adjacent tubes. The tube can be constructed of a metal (e.g., aluminum) thin plate. The multiple tubes and fins are integrated by brazing or the like. The heater core 13 is arranged at an air downstream side (toward vehicle rear side) of the evaporator 12, with a predetermined distance therebetween.

The heater core 13 functions to reheat cool air having passed through the evaporator 12. Engine cooling water (warm water) having a high temperature flows in the heater core 13 to heat air, as a heat source. The heater core 13 is thin in the vehicle longitudinal direction, and arranged somewhat obliquely in the air conditioner casing 11 with a longitudinal direction thereof oriented toward the vehicle up-down direction.

The heater core 13, as well known, has multiple flat tubes which are stacked with corrugated fins intervening. That is, the corrugated fin is arranged between the adjacent tubes. The tube can be constructed of a metal (e.g., aluminum) thin plate. The multiple tubes and fins are integrated by brazing or the like.

A cool air bypass passage 15, through which air flows to bypass the heater core 13, is arranged in the air conditioner casing 11 and positioned at an upper side of the heater core 13.

An air mixing door 16 is arranged adjacent to an upper ends of the heater core 13 and at a vehicle front side of the heater core 13, to adjust an air amount ratio of air (warm air) passing through the heater core 13 and air (cool air) passing through the cool air bypass passage 15.

The air mixing door 16 has a substantial flat-plate shape, which is coupled integrally to a rotation shaft 16a arranged horizontally, to be rotatable together with the rotation shaft 16a in the up-down direction of the vehicle.

Moreover, the air conditioner casing 11 is provided therein a warm air passage 18, which is positioned at an air downstream side (vehicle rear side) of the heater core 13 and directed upward from an immediate rear side of the heater core 13.

The rotation shaft 16a of the air mixing door 16 is supported rotatably at the air conditioner casing 11 and projects out of the air conditioner casing 11 to be joined to a linkage 17a, through which the rotation shaft 16a is rotationally operated by a servomotor 17 being a temperature control mechanism for the air conditioner.

A cool/warm air mixing space 20 is defined at an air downstream side (vehicle rear side) of the cool air bypass passage 15. Cool air from the cool air bypass passage 15 and warm air from the warm air passage 18 are mixed at the cool/warm air mixing space 20.

A defroster opening 21, through which temperature-controlled air from the cold/warm air mixing space 20 flows, is arranged at a vehicle front portion of the air conditioner casing 11, and opened at an upper surface of the air conditioner casing 11. The defroster opening 21 is connected through a defroster duct (not shown) to a defroster blowing-out port, from which air is blown-out toward an inner surface of a front window (windshield) or the like of the vehicle.

The defroster opening 21 is opened and closed by a defroster door 22. The defroster door 22 is constructed of a flat plate door portion which is joined to a rotation shaft 22a supported rotatably at the air conditioner casing 11.

A face opening 23, through which temperature-controlled air from the cold/warm air mixing space 20 flows, is arranged at the upper surface of the air conditioner casing 11 and positioned at a vehicle rear side of the defroster opening 21. The face opening 23 is connected through a face duct (not shown) to a face blowing-out port, which is arranged at an upper side of a left-right-direction central portion of the dashboard. Air is blown-out toward a head portion of a passenger at a substantially central portion in the passenger compartment.

The face opening 23 is opened and closed by a face door 24. The face door 24 is constructed of a flat plate door portion joined to a rotation shaft 24a, which is supported rotatably at the air conditioner casing 11.

As shown in FIG. 1, foot openings 25 (only one thereof is shown) are arranged at left-right-direction side surfaces of the air conditioner casing 11, and positioned respectively at a vehicle right side and a vehicle left side of the cold/warm air mixing space 20. Temperature-controlled air from the cold/warm air mixing space 20 flows through the foot opening 25, which is connected through a foot duct (not shown) to a foot blowing-out port. Thus, air can be blown-out toward a lower portion of the passenger through the foot blowing-out port.

The foot openings 25 are opened and closed by foot doors 26. The foot door 26 is constructed of a sector-shaped door portion joined to a rotation shaft 26a, which is supported rotatably at the air conditioner casing 11.

The defroster door 22, the face door 24, and the foot doors 26 function as mode doors for switching blow-out modes, and are connected with a linkage 27a to be interlocked by a servomotor 27, which serves as a blowing-out mode switching mechanism.

The air conditioner has an electronic controller (not shown), into which operation signals from various operation members provided on an air conditioning operation panel and sensor signals from various sensors for air conditioning control are input. Positions of the doors 16, 22, 24 and 26 are controlled by output signals from the electronic controller.

Next, the construction of a refrigerant introduction/discharge part of the evaporator 12 of the air conditioner will be described.

Figure 2A:
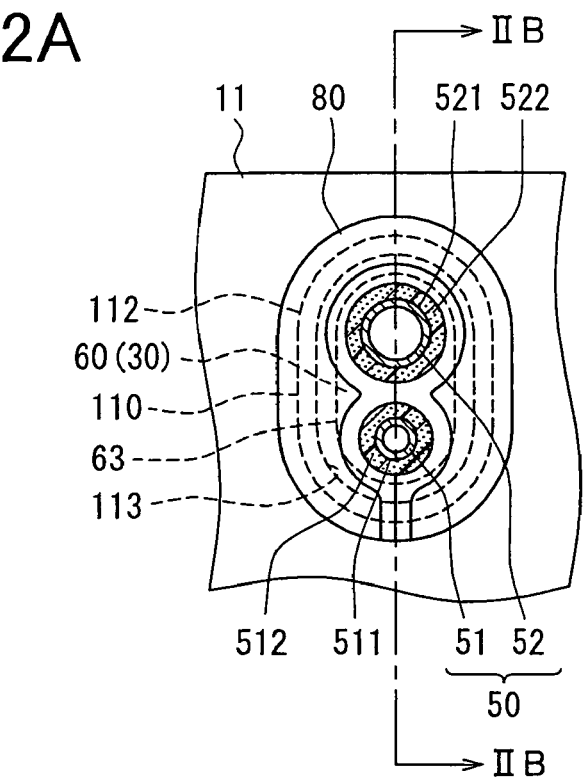
FIG. 2A is an enlarged schematic sectional view showing a main part of the air conditioning component according to the first embodiment.
Figure 2B:
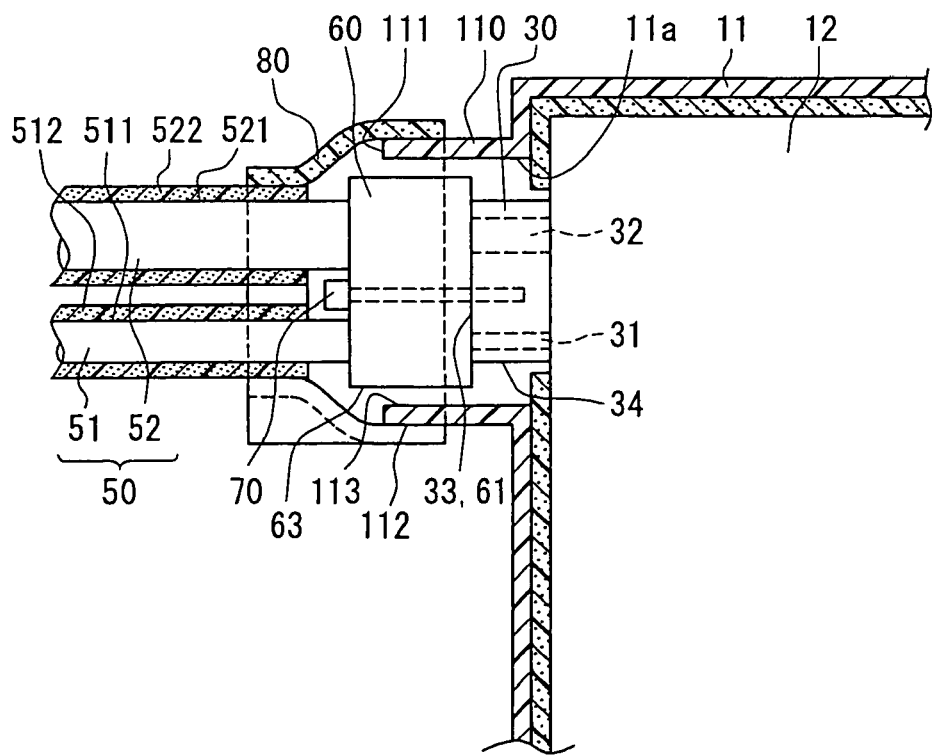
FIG. 2B is a vertical partial sectional view taken along a line IIB-IIB in FIG. 2A.

As shown in FIG. 2B, the evaporator 12 accommodated in the air conditioner casing 11 is provided with an evaporator-side connector 30, which projects from the evaporator 12 and extends toward an outer side of the air conditioner casing 11 through an opening 11a formed at the air conditioner casing 11.

The evaporator-side connector 30 has therein a refrigerant introduction passage 31, through which refrigerant is introduced into the evaporator 12, and a refrigerant discharge passage 32, through which refrigerant is discharged from the evaporator 12.

The evaporator-side connector 30 is fixedly connected to a piping-side connector 60 through a fixing member 70 (e.g., screw member) by screwing, for example. In this case, one end surface 61 (at right side in figure) of the piping-side connector 60 abuts against (contacts) an end surface 33 of a projecting side (left side in figure) of the evaporator-side connector 30.

Other end surface of the piping-side connector 60 is connected with the piping group 50. The piping-side connector 60 and the decompression valve 40 are respectively attached to the two axial ends of the piping group 50 (including introduction pipe 51 and discharge pipe 52, for example).

Thus, the evaporator-side connector 30 (in which refrigerant introduction passage 31 and refrigerant discharge passage 32 are arranged) and the piping group 50 are respectively connected with the two sides of the piping-side connector 60, so that the introduction pipe 51 and the discharge pipe 52 are respectively communicated with the refrigerant introduction passage 31 and the refrigerant discharge passage 32 via the piping-side connector 60.

A surrounding wall member 110, having a substantially even thickness, is erected at the air conditioner casing 11. In this case, the surrounding wall member 110 is arranged upright at the air conditioner casing 11 around the opening 11a, into which the evaporator-side connector 30 is inserted. A tip portion 111 of the surrounding wall member 110 projects toward the piping group 50 to extend beyond the end surface 33 of the evaporator-side connector 30, to reach laterally the piping-side connector 60.

That is, the surrounding wall member 110 encircles a connection part of the connectors 30 and 60, at which the end surface 33 of the evaporator-side connector 30 and the end surface 61 of the piping-side connector 60 contact each other.

As shown in FIG. 2A, the outer side of the evaporator-side connector 30 along the surrounding wall member 110 is substantially elliptically shaped. Similarly, the outer side of the piping-side connector 60 along the surrounding wall member 110 is also substantially elliptical-shaped.

That is, the cross sections, which are perpendicular to the erection direction of the surrounding wall member 110, of the evaporator-side connector 30 and the piping-side connector 60 are substantially elliptically shaped and similar in dimension to each other.

Moreover, the cross section, which is perpendicular to the erection direction of the surrounding wall member 110, of the surrounding wall member 110 has a substantial ellipse shape. A spacing between an inner peripheral surface 113 of the surrounding wall member 110 and an outer peripheral surface 34 of the connector 30 is substantially uniformed in a circumferential direction of the surrounding wall member 110. Similarly, a spacing between the inner peripheral surface 113 and an outer peripheral surface 63 of the connector 60 is substantially uniformed in the circumferential direction of the surrounding wall member 110. The surrounding wall member 110 is arranged close to the outer peripheral surfaces 34, 63 of the connectors 30, 60.

Preferably, the inner peripheral surface 113 of the surrounding wall member 110 and the outer peripheral surface 34 of the evaporator-side connector 30 defines therebetween the gap, which makes it easy for the evaporator-side connector 30 to project from the opening 11a. Furthermore, the inner peripheral surface 113 of the surrounding wall member 110 and the outer peripheral surface 63 of the piping-side connector 60 defines therebetween the gap, which makes it easy to insert and position the piping-side connector 60 when the piping-side connector 60 is to be connected to the evaporator-side connector 30.

Thus, the spacing between the inner peripheral surface 113 of the surrounding wall member 110 and the outer peripheral surface 63 of the piping-side connector 60 is made substantially even in the circumferential direction of the surrounding wall member 110. Moreover, the gaps between an outer peripheral surface 112 of the surrounding wall member 110 and outer peripheral surfaces 511, 521 of the piping group 50 (including introduction pipe 51 and discharge pipe 52) are substantially uniformed in the circumferential direction of the surrounding wall member 110.

A heat-insulating seal member 80 (e.g., seal packing) is arranged to cover a whole area between the surrounding wall member 110 and the outer peripheral surfaces 511, 521 of the piping group 50 (including introduction pipe 51 and discharge pipe 52). The seal packing 80 is made of a resin or a rubber foam.

According to this embodiment, the seal packing 80 is constructed of a sheet-shaped foam member made of an urethane material or an EPDM material and having an excellent flexibility. An adhesive layer is arranged at an inner surface of the seal packing 80 to be stuck to a neighborhood of the tip end 111 of the outer peripheral surface 112 of the surrounding wall member 110 and the outer peripheral surfaces 511, 521 of the piping group 50, so as to cover the whole area between the surrounding wall member 110 and the piping group 50.

The piping group 50 can be provided with a heat-insulating layer member which includes insulators 512 and 522, for example. The insulators 512 and 522 are respectively arranged around the outer peripheral surface 511 of the introduction pipe 51 and the outer peripheral surface 521 of the discharge pipe 52. In this case, the seal packing 80 is stuck to the insulators 512, 522 arranged at the outer peripheral surfaces 511, 521 of the pipes 51, 52. In the case where the heat-insulating layer member is not provided, the seal packing 80 is stuck to the outer peripheral surfaces 511, 521 of the pipes 51, 52.

In mounting the seal packing 80 to the connection part of the evaporator-side connector 30 and the piping-side connector 60, one edge (end) of the sheet-shaped seal packing 80 (having adhesive layer which is arranged at inner side thereof) is firstly stuck circumferentially to the neighborhood of the tip portion 111 of the outer peripheral surface 112 of the surrounding wall member 110.

Subsequently, the other edge (end) of the seal packing 80 is stuck to the outer peripheral surface 512 of the introduction pipe 51 and the outer peripheral surface 522 of the discharge pipe 52, while the seal packing 80 is integrally bonded at the part thereof positioned at the outer side (lower side of introduction pipe 51 as shown in FIG. 2B, for example) of an alignment direction of the pipes 51 and 52 and at the part thereof between the pipes 51 and 52.

Thus, the surrounding wall member 110 which is erected from the air conditioner casing 11 encircles the evaporator-side connector 30, to which the piping-side connector 60 is connected, and the tip portion 111 of the surrounding wall member 110 projects beyond the end surface 33 which is positioned at the protrusion side of the evaporator-side connector 30. That is, the surrounding wall member 110 encircles the connection part between the evaporator-side connector 30 and the piping-side connector 60. The seal packing 80 covers the whole area between the surrounding wall member 110 and the outer peripheral surfaces 511, 521 of the piping group 50.

Accordingly, the seal packing 80 can be attached to the side of the piping group 50, via the relatively small-sized connection part where the evaporator-side connector 30 and the piping-side connector 60 are directly connected to each other (without decompression valve arranged therebetween).

Furthermore, the surrounding wall member 110 is formed along the outside shapes of the connectors 30 and 60 to be relatively small.

Therefore, as shown in FIG. 1, the seal packing 80 can be readily mounted even when the servomotors 17, 27, the linkages 17a, 27a and the like are arranged around the connection part of the evaporator-side connector 30 and the piping-side connector 60.

In this case, the attachment of the seal packing 80 can be performed from the outer side of the surrounding wall member 110 and the piping group 50, thus becoming further easy.

Moreover, the surrounding wall member 110 is provided with the smooth outer peripheral surface 112, and the substantially ellipse-shaped cross section which is perpendicular to the erection direction of the surrounding wall member 110. Furthermore, differences in level between the outer peripheral surface 112 of the surrounding wall member 110 and the outer peripheral surfaces 511, 521 of the piping group 50 are substantially even in the circumferential direction of the surrounding wall member 110. Accordingly, sticking of the seal packing 80 becomes easy and the sealing capacity thereof is substantially ensured.

Thus, the mounting performance of the seal packing 80 can be improved, while dew condensation can be substantially restricted.

In this embodiment, the seal packing 80 is stuck to the insulators 512 and 522 which are respectively arranged around the outer peripheral surfaces 511 and 521 of the introduction pipe 51 and the discharge pipe 52. Accordingly, the seal packing 80 and the insulators 512, 522 can construct an insulating sealing structure to substantially restrict dew condensation.

According to this embodiment, the seal packing 80 is made of the resin, the rubber foam or the like, so that the insulating capacity is readily ensured and the seal packing 80 can become lightweight. Further, handling of the seal packing 80 becomes easy.

Second Embodiment

A second embodiment according to the present invention will be described with reference to FIGS. 3A and 3B. In this case, the seal packing 80 contacts a different part of the surrounding wall member 110 from that in the above-described first embodiment.

Figure 3A:
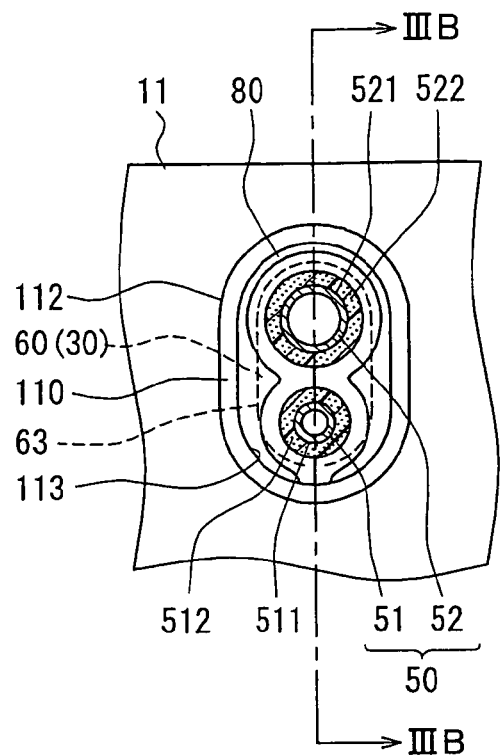
FIGS. 3A is an enlarged schematic sectional view showing a main part of an air conditioning component of an indoor unit of an air conditioner for a vehicle according to a second embodiment of the present invention.
Figure 3B:
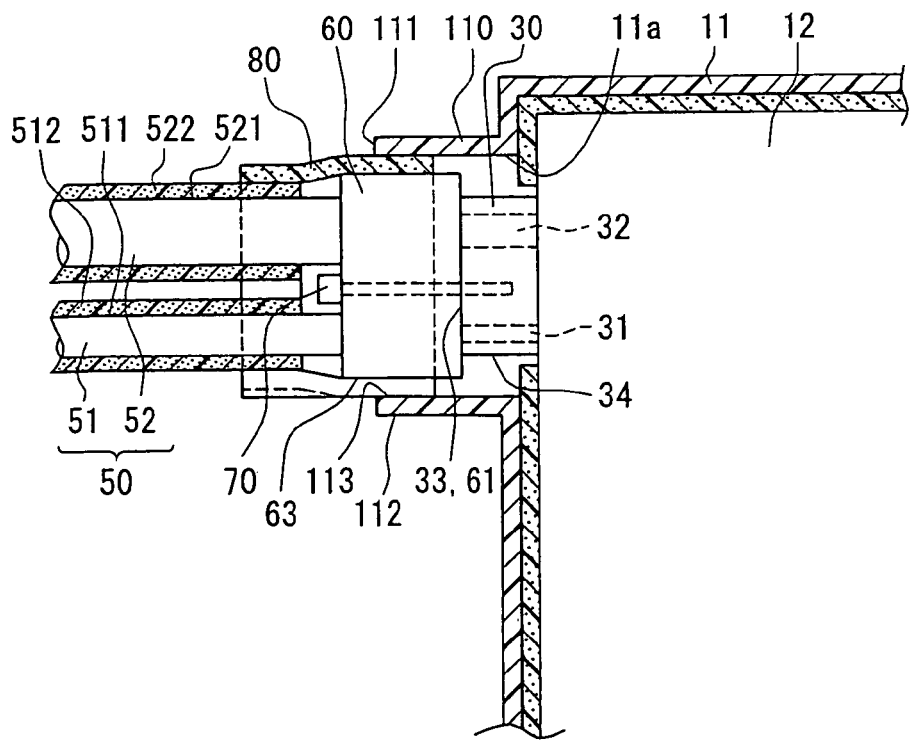
FIG. 3B is a vertical partial sectional view taken along a line IIIB-IIIB in FIG. 3A.

According to the second embodiment, as shown in FIGS. 3A and 3B, the heat-insulating seal member 80 (e.g., seal packing) is arranged to contact the inner peripheral surface 113 of the surrounding wall member 110 and the insulators 512 and 522 which are respectively arranged around the outer peripheral surfaces 511 and 521 of the piping group 50 (including introduction pipe 51 and discharge pipe 52). The seal packing 80 is made of the resin, the rubber foam or the like.

The one edge (end) of the seal packing 80 is stuck (glued) to the inner peripheral surface 113 of the surrounding wall member 110. In this case, an outer surface of the one end of the seal packing 80 is provided with an adhesive layer, through which the seal packing 80 adheres to the inner peripheral surface 113. Alternatively, the one end of the seal packing 80 can be also pressed against the inner peripheral surface 113.

In this case, the inner surface of the heat-insulating seal member can be provided with an adhesive layer which is arranged at least at the part of the inner surface which contacts the outer peripheral surfaces 511 and 521 of the piping group 50.

Thus, the seal packing 80 can be arranged at the inner side of the surrounding wall member 110. Therefore, the seal packing 80 can be small-sized, and the seal packing 80 can be attached even when the space around the surrounding wall member 110 is small.

Moreover, the gaps between the inner peripheral surface 113 of the surrounding wall member 110 and the outer peripheral surfaces 511, 521 of the piping group 50 are substantially even in the circumferential direction of the surrounding wall member 110. Furthermore, the spacing between the inner peripheral surface 113 of the surrounding wall member 110 and the outer peripheral surface 63 of the piping-side connector 60 is substantially even in the circumferential direction of the surrounding wall member 110.

Accordingly, the sheet-shaped seal packing 80 can readily cover the whole area between the inner peripheral surface 113 of the surrounding wall member 110 and the outer peripheral surfaces 511, 521 of the piping group 50.

Thus, the attachment performance of the seal packing 80 can be improved by a size reduction thereof, while dew condensation can be substantially restricted.

In the second embodiment, what has not been described about the air conditioner is the same with the first embodiment.

Third Embodiment

Figure 4A:
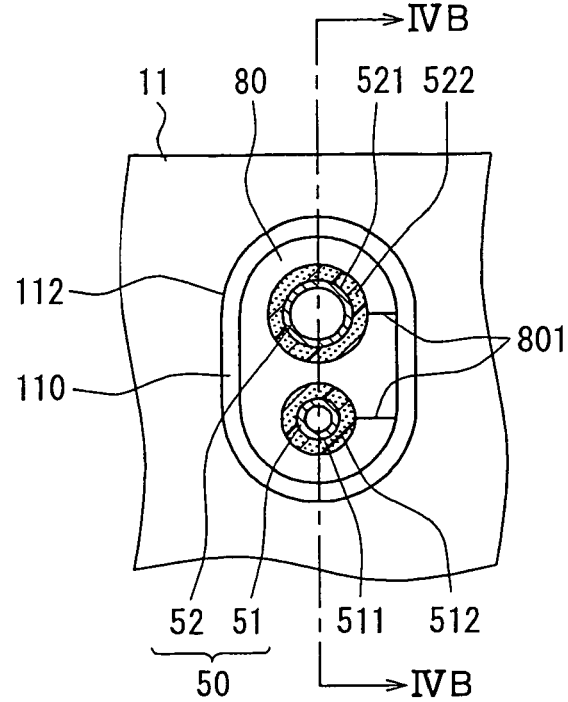
FIG. 4A is an enlarged schematic sectional view showing a main part of an air conditioning component of an indoor unit of an air conditioner for a vehicle according to a third embodiment of the present invention.

A third embodiment of the present embodiment will be described with reference to FIGS. 4A and 4B. In this case, an erection-direction length of the surrounding wall member 110 which is provided upright at the air conditioner casing 11 is enlarged, as compared with the above-described first and second embodiments.

Figure 4B:
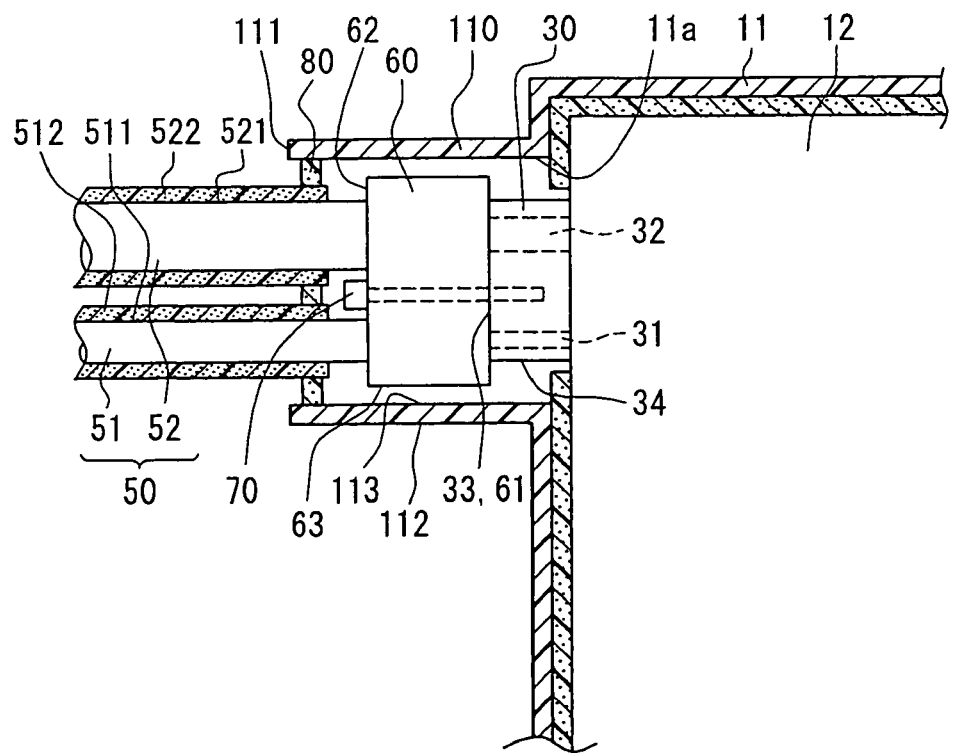
FIG. 4B is a vertical partial sectional view taken along a line IVB-IVB in FIG. 4A.

According to the third embodiment, as shown in FIG. 4B, the surrounding wall member 110 further extends toward the side of the piping group 50 than that according to the first and second embodiments, such that the tip portion 111 of the surrounding wall member 110 protrudes beyond the end surface 62 (at side of piping group 50) of the piping-side connector 60.

The heat-insulating seal member 80 (e.g., seal packing) is fitted to contact the inner peripheral surface 113 of the surrounding wall member 110, and the insulators 512 and 522 which are respectively arranged around the outer peripheral surfaces 511 and 521 of the piping group 50 (including introduction pipe 51 and discharge pipe 52)e The seal packing 80 is made of a resin, or a rubber foam or the like which has a higher hardness than that according to the above-described embodiments. That is, according to the third embodiment, the seal packing 80 is constructed to be more resistant to distortion, in order to facilitate the mounting of the seal packing 80 by means of fitting.

The seal packing 80 is provided with notches 801. In the mounting of the seal packing 80, the piping group 50 is inserted through the seal packing 80 via the notches 801, and then the seal packing 80 is pushed to the inner side of the surrounding wall member 110.

According to the third embodiment, it is unnecessary to provide the adhesive layer or the like at the seal packing 80, so that a work for peeling off a separator (mold releasing paper, released paper or the like) in the mounting can be eliminated. Therefore, the mounting performance can be further improved.

In the third embodiment, what has not been described about the air conditioner is the same with the first embodiment.

Fourth Embodiment

A fourth embodiment of the present invention will be described with reference to FIGS. 5 to 7. In this case, the heat-insulating seal member 80 includes multiple elastic cover members.

Figure 5:
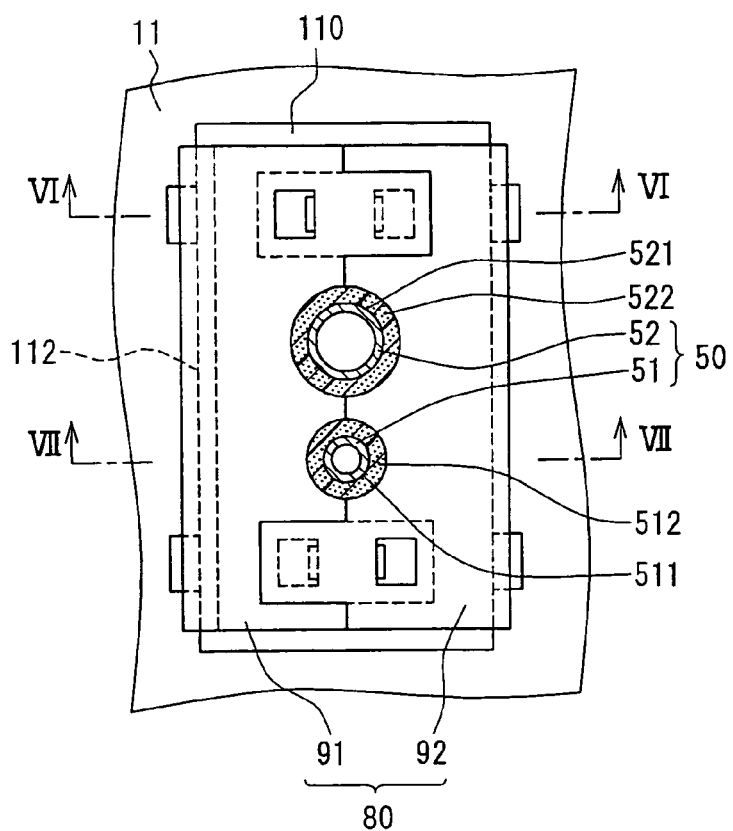
FIG. 5 is an enlarged schematic sectional view showing a main part of an air conditioning component of an indoor unit of an air conditioner for a vehicle according to a fourth embodiment of the present invention.

According to the fourth embodiment, as shown in FIG. 5, the surrounding wall member 110 has a substantially rectangular-shaped cross section which is perpendicular to the erection direction of the surrounding wall member 110. The surrounding wall member 110 is arranged upright (erected) at the air conditioner casing 11, to surround the connection part of the evaporator-side connector 30 and the piping-side connector 60.

In this embodiment, the heat-insulating seal member 80 is constructed of a seal cover made of a resin (e.g., polypropylene resin), which has a larger modulus of elasticity than the seal packing described in the first-third embodiments. That is, the seal cover 80 has a relatively high elasticity.

The seal cover 80 has, for example, a first division member 91 and a second division member 92 (elastic cover members) which are separately molded.

The first division member 91 and the second division member 92 are coupled with each other, with the piping group 50 (including introduction pipe 51 and discharge pipe 52) interposed therebetween. The engagement integral of the division members 91 and 92 is engaged with the surrounding wall member 110, to cover the whole area between the outer peripheral surface 112 of the surrounding wall member 110 and outer peripheral surfaces 511, 521 of the piping group 50.

Figure 6:
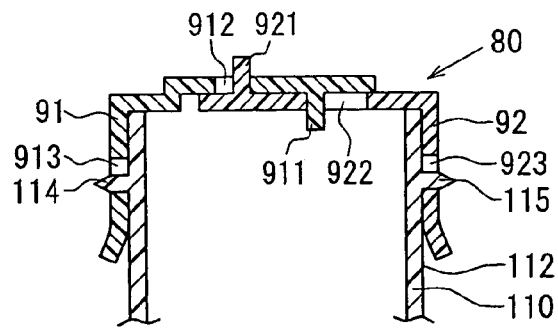
FIG. 6 is a vertical sectional view taken along a line VI-VI in FIG. 5.

Specifically, referring to FIGS. 5 and 6, the first division member 91 and the second division member 92 are arranged to partially overlap each other. In this case, the first division member 91 and the second division member 92 can be provided with two overlap parts, for example, an upper overlap part and a lower overlap part as shown in FIG. 5.

As shown in FIG. 6, the first division member 91 is provided with a protrusion portion 911 and a hole 912 at the upper overlap part. Similarly, at the upper overlap part, the second division member 92 is provided with a hole 922 and a protrusion portion 921, which are respectively positioned corresponding to the protrusion portion 911 and the hole 912 arranged at the first division member 91. The protrusion portion 911 of the first division member 91 is engaged with the hole 922 of the second division member 92, and the protrusion portion 921 of the second division member 92 is engaged with the hole 912 of the first division member 91.

Moreover, the first division member 91 and the second division member 92 are also engaged with each other at the lower overlap part, where the first division member 91 and the second division member 92 can be provided with an engagement mechanism similar to that at the upper overlap part thereof. In this embodiment, the first division member 91 and the second division member 92 are provided with a contrary (reverse) overlap-position relation therebetween at the upper overlap part, to that at the lower overlap part. For example, the first division member 91 is arranged at the upper side of the second division member 92 at the upper overlap part as shown in FIG. 6, while the first division member 91 is arranged at the lower side of the second division member 92 at the lower overlap part.

Thus, the first division member 91 and the second division member 92 are engaged with each other to construct the seal cover 80, with the piping group 50 being interposed between the first division member 91 and the second division member 92.

The engagement integral (seal cover 80) of the division members 91, 92 is moved toward the surrounding wall member 110 (i.e., toward air conditioner casing 11), so that holes 913 and 923 respectively formed at the division members 91 and 92 are engaged with protrusion portions 114 and 115 arranged at the outer peripheral surface 112 of the surrounding wall member 110.

Thus, the seal cover 80 is attached to the surrounding wall member 110, by engagement between the holes (including the holes 913, 923 and holes which are respectively arranged at lower portions of division members 91 and 92 as shown in FIG. 5) of the division members 91 and 92 with the protrusion portions (including the protrusion portions 114, 115 and protrusion portions which are arranged at lower portion of outer peripheral surface 112 as shown in FIG. 5) of the outer peripheral surface 112.

Figure 7:
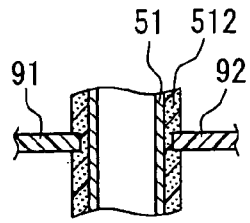
FIG. 7 is a vertical sectional view taken along a line VII-VII in FIG. 5.

In this case, as shown in FIG. 7, the vicinity of the piping group 50 is sealed by the division members 91 and 92, which sandwich therebetween the piping group 50 and compress the insulators 512 and 522 (only insulator 512 of introduction pipe 51 is shown) arranged at the outer peripheral surfaces 511 and 521 of the pipes 51 and 52 (of piping group 50).

According to this embodiment, the multiple elastic cover members (e.g., division members 91 and 92) are engaged with each other with the piping group 50 being sandwiching therebetween, thus providing a heat-insulating seal construction which covers the area between the surrounding wall member 110 and the piping group 50.

The division member 91, 92 of the seal cover 80 has a relatively high elasticity to be more resistant to distortion, as compared with the seal packing 80 according to the first-third embodiment. Accordingly, the mounting performance of the seal cover 80 which is constructed of the multiple division members can be further improved.

Other Embodiments

Although the present invention has been fully described in connection with the preferred embodiments thereof with reference to the accompanying drawings, it is to be noted that various changes and modifications will become apparent to those skilled in the art.

For example, the surrounding wall member 110 has the substantial ellipse shape according to the first-third embodiments, and has the substantial rectangle shape according to the fourth embodiment. However, the surrounding wall member 110 can also have other shape provided that the shape is relatively simple.

Specifically, in the case where the flexible seal packing 80 is used with reference to the first-third embodiments, it is preferable that the surrounding wall member 110 is shaped without being provided with a corner and an irregular configuration in the circumferential direction thereof. For example, in this case, the surrounding wall member 110 can be provided with a corner-rounded rectangle shape (i.e., shape of rectangle having arcuate corners).

In the case where the seal cover 80 having the high elasticity is used with reference to the fourth embodiment, the surrounding wall member 110 can be also have other shape (e.g., substantial ellipse shape) provided that the surrounding wall member 110 can be substantially engaged with the seal cover 80 for a sealing.

Moreover, according to the above-described embodiments, both the introduction pipe 51 and the discharge pipe 52, which are connected to the piping-side connector 60, are connected to the decompression valve 40 (expansion valve) which is the refrigerant decompression member. However, the discharge pipe 52 can be also connected to a member other than the decompression valve 40, provided that the introduction pipe 51 is connected with the decompression valve 40.

Such changes and modifications are to be understood as being in the scope of the present invention as defined by the appended claims.

What is claimed is:
1. An air conditioner, comprising
an air conditioner casing, in which air flows, the air conditioner casing having an opening;
an evaporator arranged in the air conditioner casing to cool air flowing in the air conditioner casing;

an evaporator-side connector which protrudes from the evaporator toward an outer side of the air conditioner casing through the opening,
the evaporator-side connector having therein a refrigerant introduction passage, through which refrigerant is introduced into the evaporator, and a refrigerant discharge passage, through which refrigerant is discharged from the evaporator,
the air conditioner casing having a surrounding wall member, which encircles the evaporator-side connector and is erected at the air conditioner casing so that a surrounding-shaped tip portion thereof projects beyond an end surface of a protrusion side of the evaporator-side connector;
a refrigerant decompression member which is arranged apart from the evaporator to decompress refrigerant;
a piping group having an introduction pipe, through which refrigerant decompressed by the refrigerant decompression member is introduced into the refrigerant introduction passage, and a discharge pipe, through which refrigerant discharged via the refrigerant discharge passage flows;
a piping-side connector, which is arranged at an opposite end of the piping group to the refrigerant decompression member and connected with the evaporator-side connector to respectively communicate interiors of the introduction pipe and the discharge pipe with the refrigerant introduction passage and the refrigerant discharge passage; and
a heat-insulating seal member which covers a whole area between the surrounding wall member and outer peripheral surfaces of the introduction pipe and the discharge pipe of the piping group.

2. The air conditioner according to claim 1, wherein the surrounding wall member is erected at the air conditioner casing so that the tip portion of the surrounding wall member projects beyond an end surface of a piping group side of the piping-side connector.

3. The air conditioner according to claim 1, wherein the heat-insulating seal member is arranged to contact an outer peripheral surface of the surrounding wall member and the outer peripheral surfaces of the piping group.

4. The air conditioner according to claim 3, wherein gaps between the outer peripheral surface of the surrounding wall member and the outer peripheral surfaces of the piping group are substantially even in a circumferential direction of the surrounding wall member.

5. The air conditioner according to claim 1, wherein the heat-insulating seal member is arranged to contact an inner peripheral surface of the surrounding wall member and the outer peripheral surfaces of the piping group.

6. The air conditioner according to claim 5, wherein gaps between the inner peripheral surface of the surrounding wall member and the outer peripheral surfaces of the piping group are substantially even in a circumferential direction of the surrounding wall member.

7. The air conditioner according to claim 1, wherein the surrounding wall member has a substantially ellipse-shaped cross section, which is perpendicular to an erection direction of the surrounding wall member.

8. The air conditioner according to claim 7, wherein the piping-side connector is substantially elliptically shaped at an outer side thereof along the surrounding wall member.

9. The air conditioner according to claim 1, wherein a spacing between an inner peripheral surface of the surrounding wall member and an outer peripheral surface of the piping-side connector is substantially even in a circumferential direction of the surrounding wall member.

10. The air conditioner according to claim 1, wherein the heat-insulating seal member is made one of a resin and a rubber foam.

11. The air conditioner according to claim 1, wherein the heat-insulating seal member is constructed of a plurality of elastic cover members, which are engaged with each other with the piping group being interposed therebetween.

12. The air conditioner according to claim 11, wherein the cover member is made of a resin.

13. The air conditioner according to claim 1, wherein:
the piping group has a heat-insulating layer member which is arranged at the outer peripheral surfaces of the piping group; and
the heat-insulating seal member contacts an outer peripheral surface of the heat-insulating layer member.

14. The air conditioner according to claim 1, wherein
a gap between an inner peripheral surface of the surrounding wall member and an outer peripheral surface of the evaporator-side connector is substantially even in a circumferential direction of the surrounding wall member.

15. The air conditioner according to claim 1, wherein
the heat-insulating seal member is a seal packing which has a substantial sheet shape and is made of one of an urethane material and an EPDM material.

16. The air conditioner according to claim 2, wherein
the heat-insulating seal member has a plurality of notches, via which the piping group is inserted through the heat-insulating seal member.

17. The air conditioner according to claim 3, wherein
the heat-insulating seal member has an adhesive layer which is arranged at an inner surface of the heat-insulating seal member.

18. The air conditioner according to claim 5, wherein
an inner surface of the heat-insulating seal member is provided with an adhesive layer at least at a part of the inner surface which contacts the outer peripheral surfaces of the piping group.

19. The air conditioner according to claim 18, wherein
an outer surface of the heat-insulating seal member is provided with an adhesive layer at a part of the outer surface which contacts the inner peripheral surface of the surrounding wall member.

* * * * *